L. B. WYGANT.
ELECTRICAL BALE TIE WELDER.
APPLICATION FILED APR. 10, 1916.
1,294,590.
Patented Feb. 18, 1919.
2 SHEETS—SHEET 1.
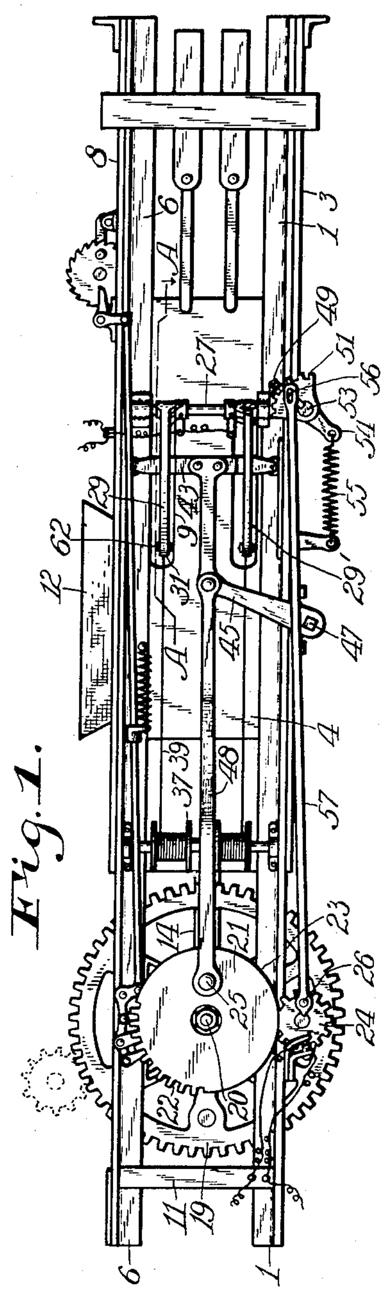
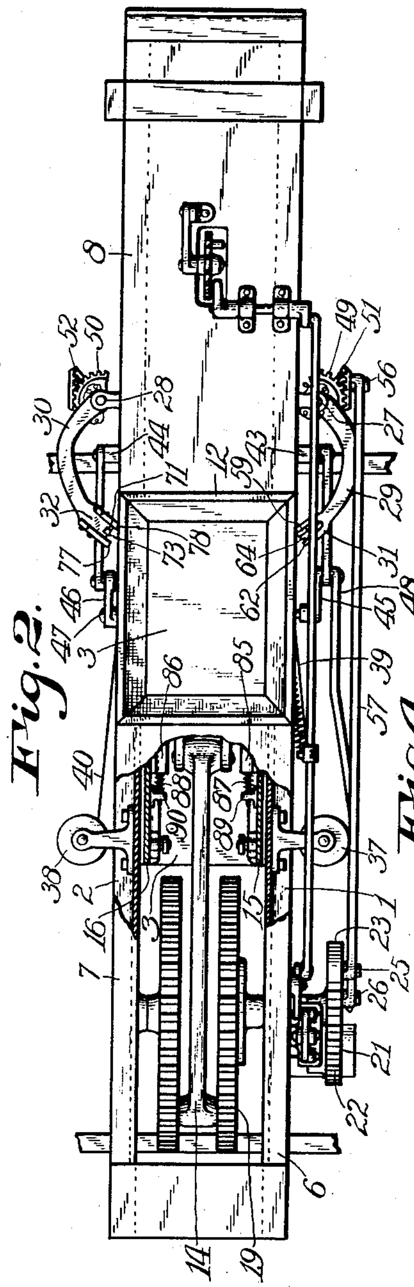
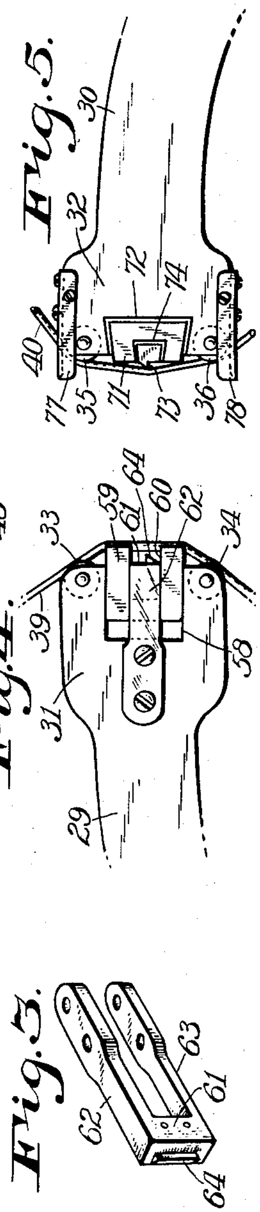
WITNESSES:
J. H. Gardner.
M. E. Sparrow.
INVENTOR:
Lewis B. Wygant,
BY
E. T. Silvius,
ATTORNEY.

L. B. WYGANT.
ELECTRICAL BALE TIE WELDER.
APPLICATION FILED APR. 10, 1916.

1,294,590.

Patented Feb. 18, 1919.

2 SHEETS—SHEET 2.

WITNESSES:
J. H. Gardner.
M. E. Sparrow.

INVENTOR:
Lewis B. Wygant,
BY
E. T. Silvius,
ATTORNEY.

UNITED STATES PATENT OFFICE.

LEWIS B. WYGANT, OF VINCENNES, INDIANA.

ELECTRICAL BALE-TIE WELDER.

1,294,590. Specification of Letters Patent. Patented Feb. 18, 1919.

Original application filed February 6, 1915, Serial No. 6,412. Divided and this application filed April 10, 1916. Serial No. 90,098.

*To all whom it may concern:*

Be it known that I, LEWIS B. WYGANT, a citizen of the United States, residing at Vincennes, in the county of Knox and State of Indiana, have invented a new and useful Electrical Bale-Tie Welder, of which the following is a specification, reference being had to the accompanying drawings and to the letters and figures of reference marked thereon.

This invention relates to means for electrically welding two portions of wire or portions of two wires together and severing the wire or wires at the welded portions, the invention having reference more particularly to means for electrically welding wires together to form bale-ties in a baling press, the principal or main features of the invention having been described in my application for Letters Patent filed February 6, 1915, Serial Number 6,412, on which Patent No. 1,232,643 issued July 10, 1917, of which the present is a divisional application for Letters Patent.

An object of the invention is to provide improved means for electrically welding wires to form bands on bales of hay or other substance in baling presses, and another object is to provide improved welder heads of such construction as to be suitable for use in baling presses and which shall be reliable and rapid in operation and be efficient, durable and economical in use.

With the above-mentioned and other objects in view, the invention consists in a pair of welder heads of novel construction to coöperate one with another in welding wires together and provided with improved means for severing the welded wires, the invention consisting further in the novel parts, the combinations and arrangements of parts, as hereinafter particularly described and further defined in the appended claims.

Figure 6:
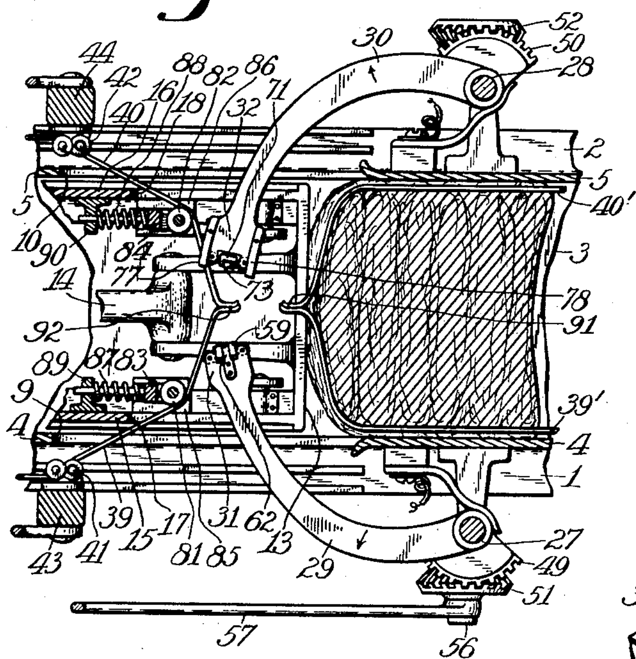
Figure 7:
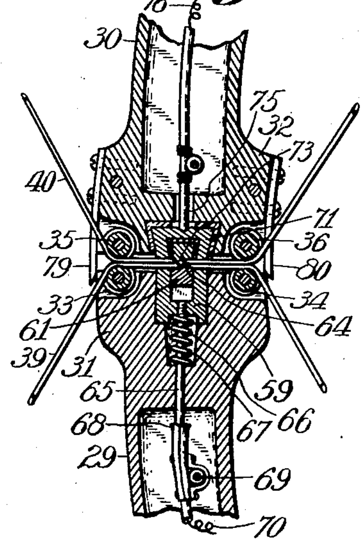
Figure 9:
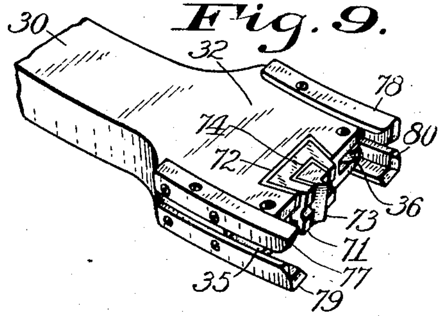
Figure 8:
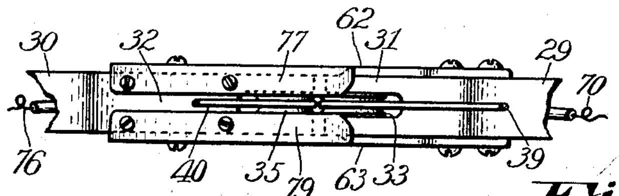
Figure 12:
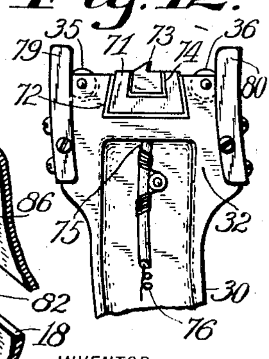
Figure 11:
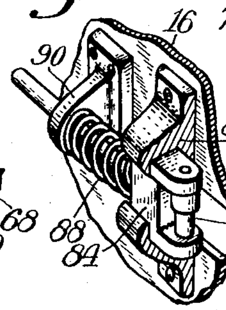
Figure 10:
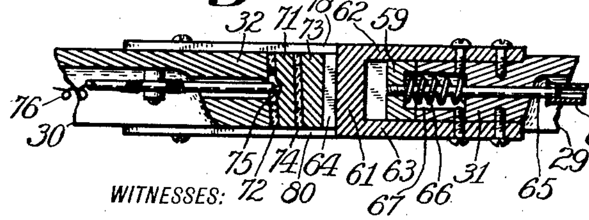

Referring to the drawings, Figure 1 is a side elevation of a baling press equipped with the improved welder heads as illustrating the peculiar and advantageous application of the invention; Fig. 2 is a top plan of the baling press partially broken away; Fig. 3 is a perspective view of one of the parts of the invention that carries a shear blade; Fig. 4 is a top plan of one of the improved welder heads; Fig. 5 is a top plan of the companion 1 of the improved welder heads; Fig. 6 is a fragmentary horizontal section approximately on the line A A on Fig. 1, the welder heads being arranged as they would appear after having caused two wires to be welded and severed; Fig. 7 is a horizontal section of the two improved welder heads connected together as when in operation; Fig. 8 is a front elevation of the welder heads connected together; Fig. 9 is a perspective view of one of the welder heads; Fig. 10 is a vertical central section of the two welder heads connected together; Fig. 11 is a fragmentary perspective view of one of the appliances provided for assisting to force the welder heads together for operation; and, Fig. 12 is an inverted plan view of the welder head shown in Fig. 9.

On the different figures of the drawings, like parts or features of construction are indicated by like characters of reference.

In order to show supporting means for the improved welder heads and describe the mode of operation thereof and the results attained by the invention, portions of the baling press forming the subject matter of said Letters Patent No. 1,232,643, dated July 10, 1917, are herein briefly referred to. The frame or body part of the baling press comprises bottom rails 1 and 2, a floor plate 3 secured to the rails, side plates 4 and 5 secured to the rails respectively, top rails 6 and 7 secured upon the side plates respectively, and a top plate 8 secured upon the top rails, so as to constitute a compression or baling chamber, the side plates 4 and 5 of which have horizontal slots 9 and 10 therein respectively to permit the movement of the welder heads into or out of the chamber. The frame may comprise also upright side bars 11, and the baling chamber is provided with a hopper 12. A ram head 13 is movably arranged in the baling chamber and provided with a pitman 14 whereby to move and control the head. The ram head has side plates 15 and 16 in which are horizontal slots 17 and 18 respectively, and the head 13 has a slot or slots continuing from the slots 17 and 18. Gear wheels 19 are mounted in the main frame and may be driven by various means, one of the gear wheels having a shaft 20 fixed thereto. An intermittent-motion wheel 21 is rotatably mounted on the shaft 20 and has a segment of its periphery provided with gear teeth 22, the remainder of the periphery being circular to form a guide 23. An intermittent-motion pinion 24 is mounted below the wheel 21 and adapted to be intermittently rotated a revolution thereby. The wheel 21 has a crank pin 25 and the wheel 24 has a crank pin 26 thereon. Two shafts 27 and 28 are rotatably mounted in vertical arrangement on opposite sides respectively of the main frame adjacent to the outer sides of the baling or compression chamber. A suitable number of carrier arms 29 and 30 are fixedly secured to the shafts respectively in such arrangement as to permit them to swing into the slots 9 and 10 and through the slots 17 and 18, it being preferable that both carrier arms be movable. In some cases there are similar carrier arms 29′ when it is desired that the machine form two bands for each bale. Each carrier arm on one side of the machine is provided with a welder head 31, each arm on the opposite side of the machine being provided with a welder head 32. One of the welder heads is provided with two grooved rollers 33 and 34, the other welder head being provided with similar rollers 35 and 36, for guiding wires around the front and the side of the welder head. Spools 37 and 38 are mounted on opposite sides respectively of the main frame, and wires 39 and 40 are unwound from the spools to be operated on by the welder heads. The wires are guided respectively by means of tensioning devices 41 and 42 mounted on cross-heads 43 and 44 that are movably guided on the main frame and connected to rocker arms 45 and 46 respectively that are secured to a shaft 47, and a connecting rod 48 connected to the crank pin 25 and the rocker arm 45. In order to operate the carrier arms the shafts 27 and 28 are provided respectively with relatively fixed gear segments 49 and 50 that are in mesh with gear segments 51 and 52 respectively which are fixedly secured to a rock-shaft 53 mounted on the under side of the main frame. Preferably the rock-shaft is provided with an arm 54 to which a spring 55 is connected, the latter being suitably anchored to the main frame for automatically drawing or assisting to draw the welder heads from the compression chamber. The gear segment 51 is provided with a rocker pin 56 with which a connecting rod 57 is connected, the latter being connected also to the crank pin 26. When the pinion 24 is rotated one-half revolution by the gear teeth 22 of the wheel 23 the carrier arms are swung into connection each with the other in the compression chamber, and on further rotation of the pinion the carrier arms are retracted.

One of the welder heads (31) is provided in its front with an opening adapted to constitute a guideway 58, and in the guideway a block or die 59 of suitable material is slidingly mounted, the front of the block having a recess 60 therein. A yoke for the block or die is provided which comprises a cross-bar 61 that is arranged in the recess 60, and two guide bars 62 and 63 fixed to the cross-bar and secured to the top and bottom respectively of the welder head, the guide bars extending along the top and bottom respectively of the block or die to assist in guiding it in the guideway. The cross-bar 61 has a shear blade 64 fixed thereon for assisting to cut the welded wires when the block or die is in relatively retracted position. An electrical conducting rod 65 is secured to the back of the block 59 and extends through the head and into the carrier arm which is hollow, and a spring 66 is arranged on the rod in a socket 67 formed in the head, the spring being seated against the block 59 to normally project it to constitute an electrical terminal adapted to clamp baling wires to a companion terminal block. An electrical contact device 68 which may be in the form of an expansible socket or tube is stationarily supported in the carrier arm 29 by means of a securing device 69 and has a circuit wire 70 connected thereto, the socket receiving the end of the rod 65 when the block 59 is retracted, thus completing the electrical circuit, the rod 65 being withdrawn from the socket or contact device to break the circuit when the block 59 is projected. The other one of the two welder heads (32) has a block or electrical terminal 71 secured in its front and is provided with an insulator 72, the block being provided with a shear blade 73 that is secured to the block and provided with an insulator 74, the shear blade being adapted to coöperate with the shear blade 64 to sever the welded portions of the wires. A conducting rod 75 is secured to the block 71 and has a circuit wire 76 connected therewith. The circuit wires 70 and 76 are extended along the respective carrier arms, and the requisite electrical current supplied thereto by the electrician as may be found most convenient or desirable. In order to assist the operating mechanism of the carriers to insure proper action of the operating shear blades and to guide the baling wires to the rollers that are mounted in the welder heads, one of the heads is provided with projecting guides 77 and 78 on the upper corners and reversely arranged guides 79 and 80 on the lower corners thereof, each guide being L-shaped in cross section so as to engage the two angles of the corner of the opposite welder head, thus insuring both vertical and lateral adjustment of the welder heads each to the other. The upper and lower guides are spaced apart and the forward ends of the adjacent faces beveled so as to readily pick up and guide the baling wire to the adjacent guide rollers.

For the purpose of assisting the operating mechanism of the carriers and augmenting the pressure that may be exerted thereby when the welder heads are brought together, a number of rollers 81 and 82, one for each carrier arm, are mounted on the inner sides of the side plates 15 and 16 of the ram head in vertical arrangement and opposite to the slots in the plates. Preferably the rollers are mounted in slides 83 and 84 respectively that are slidingly supported in guides 85 and 86 secured to the side plates, coil springs 87 and 88 being seated against the slides and against abutments 89 and 90 respectively that are secured to the side plates respectively. The arrangement is such that when the carrier arms are moved into the advancing ram head the rollers are brought into contact with the outer or front sides of the carrier arms, the front faces of the carrier arms being curved and in such relative arrangement are inclined or oblique-angled relatively to the plane of travel of the ram head, and act as cams against the rollers to enable the latter to force the two carrier arms together. Each roller has a relatively small portion adapted for guiding a baling wire between the roller and the contacting carrier arm. The springs are sufficiently strong to cause the welder heads to clamp the baling wires between them so that a perfect weld is produced, but are sufficiently yielding to guard against breakage of various parts of the mechanism brought into coöperation.

It should be observed that because of the recess 60 in the electrical terminal block 59 the block has two contact portions and likewise the terminal block 71 has two contact portions because of the insertion of the base of the shear blade 73 in the front of the block. It should be understood, however, that the shear blades may be variously mounted on the welder heads and also various modifications may be made in the shape and arrangement of the terminal blocks. Portions of the wires 39 and 40 being brought together and welded are severed at the weld so that portions 39′ and 40′ are separated to form a bale band having a welded portion 91 separated from a welded portion 92 of the wires 39 and 40, so as to form a portion of another bale band.

It should be understood that the electrical circuit should be broken before the terminal block 59 is drawn away from the opposite terminal block or from contact with the intervening wires, in order to avoid causing an electrical arc as the welder heads are moved apart. Also the relative portions or parts for adjustment are such that as the welder heads are brought together the projected terminal block 59 is brought first into contact with the baling wires so as to force them together slightly in advance of the period of making the electrical circuit complete, there being an interval in which the wires become heated and commence to weld before the shear blade 64 is advanced to coöperate with the opposite shear blade and sever the wires. The circuit breaker may be variously constructed as to details, and in some cases may be constructed as described in said prior application for Letters Patent. The mechanism whereby the wheel 21 is caused to rotate either intermittently to bring about the welding operations after each bale is formed in the machine, being features of said prior application, are not herein described although appearing in the drawings.

In practical use during the operation of the machine, an electrical current being supplied, the substance to be baled is fed into the hopper when the ram head is retracted, the repeated forward movement of the ram head causing the substance to be packed into the chamber in wire loops previously formed of the baling wires, while the carrier arms remain at rest. When the proper amount of the substance is packed to form a bale the carrier arms are caused to be swung into the baling chamber and into the ram head, the welder heads carrying the baling wires with them and bringing the wires together between the heads, the welding and subsequent severing of the welded portions being automatically effected through the means provided for the purpose, as will be readily understood, since the electrical resistance of the baling wires produces sufficient heat in the wires to cause fusion and welding of the wires. Continuous operation of the machine results in producing the bale bands in succession as the bales are formed. Various movements and minor results of the operation of the various parts of the invention will be readily understood from the detailed description of the construction and function thereof without further explanation.

Having thus described the invention, what is claimed as new is—

1. An electrical bale-tie welder including welder heads, one of the heads being movable to the other, an electrical circuit wire carried by the movable head, and a circuit breaker or connector for the wire mounted on the movable head.

2. An electrical bale-tie welder including two welder heads, one of the heads being movable to the other, an electrical circuit wire supported by and terminating in one of the heads, an electrical terminal block movably mounted in proximity to the wire within the head, and a circuit breaker or connector for the wire connected to the terminal block.

3. An electrical bale-tie welder including two arms pivotally supported to swing each toward the other, each arm having a welder head fixed thereon, two coöperative cutting-devices carried by the heads respectively, and guide devices carried by one to engage the other of the heads.

4. An electrical bale-tie welder including two welder heads supported for movement each to the other, one of the heads having an electrical terminal therein provided with a shear blade, the other one of the heads having a shear blade thereon and also a relatively movable electrical terminal.

5. An electrical bale-tie welder including two welder heads having each a movably-supported carrier, each head being provided with an electrical terminal block and also devices for guiding a wire to the block, one of the heads having guides thereon to engage the other one of the heads.

6. An electrical bale-tie welder including two welder heads, each head having two grooved rollers in the front thereof to guide a wire, two electrical terminal blocks mounted on the front of the two heads respectively, and two shear blades mounted on the two heads respectively to coöperate each with the other.

7. An electrical bale-tie welder including two welder heads supported to be moved each toward the other, each head having two grooved guides spaced apart, one of the heads being provided with a guide yoke between the two grooved guides, an electrical terminal block movably mounted in the guide yoke, and an electrical terminal block carried by the opposite one of the heads.

8. An electrical bale-tie welder including two movably-supported welder heads having each an electrical terminal block on its front and also guide devices on opposite sides respectively of the block for guiding a wire to the block, and coöperating cutters arranged on the welder heads between the guide devices.

9. An electrical bale-tie welder including a frame, two arms pivotally supported on opposite sides respectively of the frame, each arm having a welder head fixed thereon, and two shear blades carried by the welder heads respectively and projecting beyond the front of the head to coöperate with the other blade.

10. An electrical bale-tie welder including two pivotally-supported carriers having each a welder head thereon, one of the heads being provided with a shear blade and also an electrical terminal block that is yieldingly projected beyond the blade, the other one of the heads being provided with an electrical terminal block having a shear blade fixed thereto.

11. An electrical bale-tie welder including two arms pivotally supported and having each a welder head fixed thereon, means carried by each of the heads for guiding a wire on the front of the head, and means carried by the arms and the heads coöperating to conduct an electrical current to and through the wires transversely thereof.

12. An electrical bale-tie welder including a frame, two arms pivotally supported on opposite sides respectively of the frame, each arm having a welder head fixed thereon, means for pivotally moving each arm toward the other, and two electrical terminal blocks carried by the heads respectively, each block being unitary and having two spaced-apart contact faces to be carried in juxtaposition to the two faces respectively of the other of the blocks.

13. An electrical bale-tie welder including a frame, two arms pivotally supported on opposite sides respectively of the frame and provided with means for guiding two wires and holding them in approximately parallel relation each to the other, and means carried by the arms for conducting an electrical current through the portions of the wires that are in such parallel relation.

14. An electrical bale-tie welder including two arms pivotally supported to swing each toward the other, each arm having a welder head thereon provided on its front end with an electrical terminal block, the block of one of the heads being yieldingly projected beyond the end of the head, an electrical circuit wire supported on and carried by the said one of the heads, and means for connecting the projected block with the circuit wire when the block yields from projected relation.

15. An electrical bale-tie welder including two pivotally-supported arms having each a welder head thereon to be carried to the head of the other arm, a movable hollow ram to receive the welder heads, electrical terminal blocks carried by the welder heads respectively, circuit wires for the terminal blocks and carried by the arms respectively, and rollers mounted in the ram to be carried thereby into engagement with the arms respectively to force the welder heads together, the rollers being yieldingly supported.

16. In an electrical bale-tie welder, a welder head provided with two spaced-apart electrical contact faces and provided also with a cutting device between the two faces.

17. In an electrical bale-tie welder, a welder head having two guide rollers in opposite portions thereof, the head being provided with two spaced-apart electrical contact faces between the rollers and provided also with a cutting-device between the two faces.

18. In an electrical bale-tie welder, a welder head having a guideway in the front thereof and two electrical terminal elements that are adjustable relatively to the guideway, a cutter between the terminal elements and supported by the heads, and means for conducting an electrical current through the head to the said terminal elements, said means being provided with a circuit breaker.

19. In an electrical bale-tie welder, a welder head having an electrical terminal block arranged in its front with insulation between the head and the block, said block having a shear blade mounted therein with insulation between the block and the blade, said blade projecting forward beyond the front of said block.

20. In an electrical bale-tie welder, the combination of a welder head having an open guideway in the front thereof, an electrical terminal block movable forward or rearward in the guideway, a spring seated in the head and engaging the block and normally forcing the block forward, an electrical circuit supported by said head and connected with the block when the block is moved rearward, and means for breaking the circuit when the said block is moved full forward.

21. In an electrical bale-tie welder, the combination of a welder head having an opening in the front thereof, an electrical terminal block arranged in the opening and having a recess in the front thereof, a yoke embracing said block and secured to the top and bottom of the welder head, the yoke including a cross-bar extending through said recess, and a shear blade fixed on said cross-bar and projecting from the front thereof.

22. In an electrical bale-tie welder, the combination with a frame, of two arms pivotally supported on opposite sides of the frame to be moved each toward the other, two welder heads fixed on the arms respectively to clamp two wires between them, the heads being movable to or from the other, and electrical current-conducting means for conducting an electrical current through the welder heads following the clamping of the wires and automatically cutting off the current preceding the release of the wires from the heads, elements of said means being carried by said heads.

23. In an electrical bale-tie welder, the combination of a welder head having a guideway in the front thereof, a supporter for the back of the head, an electrical terminal block arranged in the guideway to move forward or rearward and having a conducting rod on its back that extends movably through the back of the head and into the supporter, and an electrical contact device supported by said supporter and engaged by said rod when said block is moved rearward, the rod being disengaged from said contact device when said block is moved fully forward.

24. In an electrical bale-tie welder, the combination of a welder head having a guideway in the front thereof and a socket extending from the rear of the guideway, a spring seated in the socket and normally extending forward into the guideway, a yoke comprising two guide bars and a cross-bar, the guide bars being secured to the top and bottom respectively of the welder head and supporting the cross-bar in the front of said guideway, and an electrical terminal block movably guided in said guideway and between said guide bars and seated on said spring to be projected forward thereby, the front of said block having a recess to receive said cross-bar.

In testimony whereof, I affix my signature in presence of two witnesses.

LEWIS B. WYGANT.

Witnesses:
JAMES B. CORRIGAN,
WM. G. FEIGENSPAN.